US011215585B2

United States Patent
Shiba et al.

(10) Patent No.: US 11,215,585 B2
(45) Date of Patent: Jan. 4, 2022

(54) NANOMECHANICAL SENSOR RECEPTOR MADE OF LOW-HYGROSCOPIC MATERIAL AND NANOMECHANICAL SENSOR USING THE SAME AS RECEPTOR

(71) Applicant: NATIONAL INSTITUTE FOR MATERIALS SCIENCE, Ibaraki (JP)

(72) Inventors: Kota Shiba, Ibaraki (JP); Kosuke Minami, Ibaraki (JP); Genki Yoshikawa, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 184 days.

(21) Appl. No.: 16/613,161

(22) PCT Filed: May 21, 2018

(86) PCT No.: PCT/JP2018/019431
§ 371 (c)(1),
(2) Date: Nov. 13, 2019

(87) PCT Pub. No.: WO2018/221283
PCT Pub. Date: Dec. 6, 2018

(65) Prior Publication Data
US 2020/0249201 A1 Aug. 6, 2020

(30) Foreign Application Priority Data
May 31, 2017 (JP) .............................. JP2017-107398

(51) Int. Cl.
*G01N 29/02* (2006.01)
(52) U.S. Cl.
CPC ... *G01N 29/022* (2013.01); *G01N 2291/0256* (2013.01); *G01N 2291/02466* (2013.01)

(58) Field of Classification Search
CPC . G01N 2291/0215; G01N 2291/02466; G01N 2291/0256; G01N 2291/0257; G01N 29/022; G01N 29/036; G01N 5/02
See application file for complete search history.

(56) References Cited

U.S. PATENT DOCUMENTS 6,342,295 B1 * 1/2002 Kobayashi ........... G01N 27/121
338/35
6,432,362 B1 8/2002 Shinar et al.
(Continued)

FOREIGN PATENT DOCUMENTS

CN 101713763 5/2010
EP 1 514 096 12/2003
(Continued)

OTHER PUBLICATIONS

International Search Report (ISR) dated Jul. 31, 2018 in International (PCT) Application No. PCT/JP2018/019431.
(Continued)

*Primary Examiner* — Francis C Gray
(74) *Attorney, Agent, or Firm* — Wenderoth, Lind & Ponack, L.L.P.

(57) ABSTRACT

The present invention provides a nanomechanical sensor in which a negative influence of water in a sample on measurement is suppressed. In an embodiment of the present invention, as a receptor material of the nanomechanical sensor, a low-hygroscopic material such as polysulfone, polycaprolactone, poly(vinylidene fluoride), or poly(4-methylstyrene) is used. According to this embodiment, a negative influence, such as saturation of a receptor layer by water in the sample, or masking of an output signal based on trace components by an output signal based on water contained in the sample in a large amount, can be suppressed.

8 Claims, 11 Drawing Sheets

(56) References Cited

U.S. PATENT DOCUMENTS

| | | | |
|---|---|---|---|
| 6,534,319 B1 | 3/2003 | Liu | |
| 2002/0011408 A1* | 1/2002 | Lee | G01N 27/27 204/414 |
| 2002/0070112 A1* | 6/2002 | Lee | G01N 27/4035 204/431 |
| 2002/0109959 A1* | 8/2002 | Toyoda | G01N 27/225 361/311 |
| 2002/0142477 A1 | 10/2002 | Lewis et al. | |
| 2012/0108450 A1* | 5/2012 | Jaworski | C07K 7/08 506/9 |
| 2013/0133433 A1 | 5/2013 | Yoshikawa et al. | |
| 2013/0336842 A1* | 12/2013 | Grange | G01N 27/223 422/90 |
| 2014/0100436 A1* | 4/2014 | Brunner | A61B 5/0536 600/372 |
| 2015/0177184 A1* | 6/2015 | Brezeanu | G01N 27/4141 257/77 |
| 2017/0172490 A1* | 6/2017 | Afentakis | H01L 27/1255 |
| 2017/0199159 A1 | 7/2017 | Kuroki et al. | |
| 2018/0003604 A1 | 1/2018 | Shiba et al. | |

FOREIGN PATENT DOCUMENTS

| | | |
|---|---|---|
| EP | 1 531 731 | 12/2003 |
| EP | 3 550 284 | 10/2019 |
| JP | 5-73560 | 10/1993 |
| JP | 2001-242057 | 9/2001 |
| JP | 2003-511676 | 3/2003 |
| JP | 2010-71716 | 4/2010 |
| JP | 2011-84487 | 4/2011 |
| WO | 2011/148774 | 12/2011 |
| WO | 2016/031080 | 3/2016 |
| WO | 2016/121155 | 8/2016 |

OTHER PUBLICATIONS

Genki Yoshikawa et al., "Nanochemical Membrane-type Surface Stress Sensor", Nano Letters, 11, pp. 1044-1048, 2011.

Gaku Imamura et al., "Smell identification of spices using nanomechanical membrane-type surface stress sensors", Japanese Journal of Applied Physics, 55, 1102B1103, 2016.

Riki Eto et al., "Smell Data Mining on the Cutting-edge IoT Olfactory Sensor", The Japanese Society for Artificial Intelligence, 31st National Convention Preliminary Report, 2B2-1, 2017, together with English translation.

Genki Yoshikawa, "Mechanical analysis and optimization of a microcantilever sensor cited with a solid receptor film", Applied Physics Letters, 98, 173502, 2011.

Office Action dated Jun. 22, 2021 in Japanese Patent Application No. 2019-522122, with English-language translation.

Notice of Reason for Refusal dated Nov. 24, 2020 in corresponding Japanese Patent Application No. 2019-522122 with English-language translation.

Extended European Search Report dated Feb. 3, 2021 in European Patent Application No. 18810328.7.

Office Action dated Sep. 3, 2021, in corresponding Chinese Patent Application No. 201880035764.0, with English translation.

\* cited by examiner

NANOMECHANICAL SENSOR RECEPTOR MADE OF LOW-HYGROSCOPIC MATERIAL AND NANOMECHANICAL SENSOR USING THE SAME AS RECEPTOR

TECHNICAL FIELD

The present invention relates to a nanomechanical sensor, and particularly to a nanomechanical sensor receptor made of a low-hygroscopic material and a nanomechanical sensor using the same as a receptor.

BACKGROUND ART

In recent years, with advancement of a nanomechanical sensor detecting a minute change in any physical quantities on a surface of a sensor main body or the vicinity thereof, trace components in a sample to be provided can be easily detected. Here, in the present application, a nanomechanical sensor refers to a sensor that detects a surface stress produced due to adsorption or absorption of a detection target to a so-called receptor layer coated on a sensor surface, or mechanical deformation (deflection) caused as a result of the surface stress. As the nanomechanical sensor, various principles and structures have been proposed. Especially, a membrane-type surface stress sensor (MSS), which has been invented and publicly disclosed by the inventors of the present application, has characteristics, such as high sensitivity and operational stability, which are easily used in various applications (Patent Literature 1 and Non Patent Literature 1).

When a chemical substance (hereinafter, the chemical substance to be detected is also referred to as an analyte) is provided to a nanomechanical sensor, the minute change in physical quantity described above occurs by an interaction with the analyte. However, since most of analytes are not adsorbed or absorbed in a large amount to a surface itself of a nanomechanical sensor main body, only a change in physical quantity which cannot be almost detected occurs. Therefore, in many cases, a material, in which a desired analyte is incorporated as many as possible by adsorption, reaction, or the like, and thereby a change in physical quantity is produced as much as possible, is selected, and the material is fixed to the surface of the sensor main body in any form of coating or the like. A substance, which causes a change in physical quantity that can be detected by the sensor main body by the substance being fixed to the surface of the sensor main body in this manner, and a membrane made by the substance are respectively referred to as a receptor and a receptor layer (depending on cases, also referred to as a sensitive material and a sensitive membrane).

In many materials, since a change in physical quantity is more or less produced in response to a plurality of kinds of analytes, in order to increase detection accuracy, identification of kinds of analytes or measurement of an amount thereof are performed based on outputs of a plurality of nanomechanical sensors provided with a plurality of kinds of receptor layers.

In addition, there are extremely many kinds of analytes which may be a detection target, and thus extremely various kinds of substances are also required to be utilized as a substance which may be a material for a receptor layer.

As a promising application field of the nanomechanical sensor, although not particularly limited, there is mentioned analysis of a sample released from a living body to the outside of the body by breathing, sweating, excretion, and the like or a sample taken out of the inside of the living body such as blood or other various body fluids (confirmation of existence of a target substance, quantitative determination thereof, or determination whether or not the amount thereof exceeds a threshold). By such analysis, determination of health conditions of humans or animals such as domestic animals (depending on cases, also including plants), diagnosis of diseases, and the like can be performed. Further, other than such determination or diagnosis, various applications using detection of a component which is contained in this kind of sample or is diffused from the sample by evaporation are considered.

However, a large amount of water is contained in a sample obtained from the living body. A large amount of water exists in the natural world although not limited to the sample obtained from the living body, and water is used in many activities of daily life or industrials. Therefore, water is contained in a large ratio in the sample in extremely many aspects. In a case where such a sample is analyzed by a nanomechanical sensor, a receptor absorbs water contained in a large ratio in the sample, and thus the majority of a change in physical quantity such as surface stress produced in the receptor layer is based on water absorbed to the receptor layer. As a result of researches of the inventors of the present application, in a case where a large amount of water is absorbed to the receptor, it is found that a phenomenon to be called a kind of masking, which affects a change in physical quantity by other trace components, may occur, for example, due to causes that a change in physical quantity such as surface stress of the receptor is saturated, or even if being not saturated, other trace components are inhibited from being adsorbed to the receptor, or a change in physical quantity by water and a change in physical quantity by other components are not necessarily linearly superimposed. That is, the majority of a detection signal based on a stress change becomes a water-derived component, a signal component by trace components is in a state of being shielded by the water-derived component, and thus it has been found that detection becomes difficult in some cases.

SUMMARY OF INVENTION

Technical Problem

An object of the present invention is to reduce a negative influence of water contained in a sample on measurement using a nanomechanical sensor. In addition, another object of the present invention is to improve measurement capability by combining nanomechanical sensors, for example, to improve identification capability of an analyte by combining such a nanomechanical sensor and another nanomechanical sensor.

Solution to Problem

According to an aspect of the present invention, a nanomechanical sensor receptor made of a low-hygroscopic material is provided.

Here, the low-hygroscopic material may be selected from the group consisting of a carbon material, a fluoride, an aromatic compound, and a compound having a hydrocarbon chain.

Further, the low-hygroscopic material may be selected from the group consisting of polysulfone, polycaprolactone, poly(vinylidene fluoride), and poly(4-methylstyrene).

The receptor may further contain a binder.

According to another aspect of the present invention, a nanomechanical sensor having a low-hygroscopic receptor layer formed by any of the receptors described above on a surface of a sensor main body is provided.

Here, the nanomechanical sensor may further have an additional membrane between the low-hygroscopic receptor layer and the sensor main body.

The additional membrane may be a self-assembled membrane.

According to still another aspect of the present invention, a nanomechanical sensor having a plurality of any of the sensor main bodies described above is provided.

Here, at least one of the plurality of the sensor main bodies may have the low-hygroscopic receptor layer.

Further, the sensor main body may be a membrane-type surface stress sensor.

Advantageous Effects of Invention

According to the present invention, by using a material having a low hygroscopicity as a material for the receptor, it is possible, for example, to significantly reduce a negative influence of water contained in a sample on an output of a nanomechanical sensor, so that a measurement by a nanomechanical sensor can be more widely applied.

DESCRIPTION OF EMBODIMENTS

The research of the inventors of the present invention has resulted in a finding that, by using a material having low hygroscopicity as a receptor of a nanomechanical sensor, sensitivity of the nanomechanical sensor with respect to water can be suppressed to a low value, and the above-described objects of the present invention are accomplished on the basis of this finding. According to the present invention, even when a sample containing a large amount of water is subjected to measurement, it is possible to reduce negative influences caused by a large content of water, for example, negative influences that an output of the nanomechanical sensor is saturated by water or even if not saturated, a large output derived from water affects a value of a detection signal of other trace component, or a detection signal of trace component is masked.

A low-hygroscopic receptor material includes, but is not limited to, a low-hygroscopic polymer. More specifically, the following polymers described in the following Examples are exemplified: polysulfone,

[Chemical Formula 1]

polycaprolactone,

[Chemical Formula 2]

poly(vinylidene fluoride), and

[Chemical Formula 3]

poly(4-methylstyrene)

[Chemical Formula 4]

Further, a carbon material, a fluoride, an aromatic compound, a compound having a hydrocarbon chain, and the like, which are commonly used as a low-hygroscopic receptor material, can be used; however, it is not limited thereto.

Contrary to the low-hygroscopic receptor material described above, carboxymethyl cellulose is exemplified as an example of a high-hygroscopic receptor material.

[Chemical Formula 5]

R = H or $CH_2CO_2H$

This material is described as a comparative example in the description of the following Examples.

In addition to the receptor materials as described above, binders improving adhesiveness to a sensor main body and other components may be added. Further, a self-assembled membrane may be coated on the surface of a sensor to enhance the affinity with a low-hygroscopic receptor material, that is, adhesiveness between such a receptor material and the surface of the sensor main body can be enhanced via the self-assembled membrane. For such a purpose, it is preferable that components such as binders to be mixed with the receptor material or the membrane itself interposed between the sensor surface and the receptor layer is hygroscopic.

Further, it is possible to not only perform measurement using a single nanomechanical sensor but also provide a sample to a plurality of nanomechanical sensors and perform analysis on the basis of outputs obtained in parallel from these nanomechanical sensors. In a case where measurement is performed using such a multichannel nanomechanical sensor, in general, a receptor layer used in each nanomechanical sensor is prepared by using receptor materials different from each other, but it is not essential that all of receptor layers to be used is low-hygroscopic. That is, in a case where identification of a sample, quantitative determination of components, and the like are performed from outputs from the plurality of nanomechanical sensors, it has been proposed that a large number of outputs from these sensors are analyzed, for example, using principal component analysis, data processing such as machine learning, or other methods (Non Patent Literature 2 and Non Patent Literature 3). In such methods, there are many cases depending on a receptor material to be actually used, kinds and amounts of components contained in a sample, and other various factors, and in some cases, by using a low-hygroscopic material only in some receptors of the nanomechanical sensors, analysis can be performed with required accuracy.

For example, in a case where a gas in which moisture to be contained is close to a saturation state such as exhaled breath is measured, it is generally considered that a low-hygroscopic receptor is preferably used in as many channels as possible in a multichannel nanomechanical sensor (individual nanomechanical sensor). However, even in such a case, setting aside a case where the receptor is completely saturated by moisture in a gas to be measured or an output obtained by a component, which is desired to be detected, cannot be almost detected by masking caused by absorbed water, in a case where a high-hygroscopic receptor is used, but only a relatively mild negative influence is received, for example, linearity of an output by a component, which is desired to be detected, is lost by moisture in a gas to be measured or sensitivity is decreased to some extent, measurement by combining a channel using a low-hygroscopic receptor and a channel using a high-hygroscopic receptor may be performed. According to this, diversity of combinations of receptors which can be used in a target to be measured can be increased. Such a multichannel nanomechanical sensor may have a constitution in which a plurality of nanomechanical sensors are formed on a single substrate. For example, in Patent Literature 1 and the like, it is described that a plurality of MSSs are formed on a single silicon substrate.

Further, when a high-hygroscopic receptor specifically responding to water is used as a one-channel receptor layer in a multichannel nanomechanical sensor, measurement of water vapor content (humidity) in the sample can be simultaneously performed at substantially the same position as that of other component in a flow channel of the sample under the same measurement condition as that of other component. That is, a humidity sensor can be equipped in the multichannel nanomechanical sensor. Such a high-hygroscopic receptor includes, but not limited to, for example, carboxymethyl cellulose as described above. In such a case, it is difficult to select, as a high-hygroscopic receptor, a substance not responding to components other than water at all, but even if an influence of other components appears in an output of a channel having the high-hygroscopic receptor layer, this type of influence can be compensated by diverting an output from one or a plurality of channels having other receptor layer (high-hygroscopic receptor layer, low-hygroscopic receptor layer, or a combination thereof) and using machine learning or other methods for the purpose of ordinary use in detection of other component.

The nanomechanical sensor detects a change in physical parameter, which is caused by the receptor layer adsorbing any analyte molecule, by the sensor main body. Therefore, the structure, operation, and the like of the sensor main body usable in the present invention are not particularly limited as long as it senses a change caused in the receptor layer by the receptor layer coated on the surface thereof adsorbing an analyte. For example, in the case of using a surface stress sensor, by the receptor layer coating the surface thereof adsorbing an analyte, a change in stress produced in the receptor layer is detected and then the surface stress sensor outputs a signal.

Examples of the sensor main body coated with the receptor layer include various types of surface stress sensors as described in Patent Literature 1, for example. However, a shape, a material, a size, or the like of the sensor main body is not specifically limited, and any object can be used. Preferred examples include, for example, a slice-like member which is supported at one or multiple portions. In addition, a members of various form, such as a slice-like object supported at two or more portions, for example, a double-supported beam, membrane, and the like can be adopted.

Further, for example, an oscillator such as a quartz crystal microbalance (Quartz Crystal Microbalance, QCM) or a cantilever, a sensor utilizing surface plasmon resonance (Surface Plasmon Resonance, SPR), sensors measuring electrical conductivity of samples added with a conductive material such as metal nanoparticles or a conductive material such as carbon black, a field-effect transistor or other sensors applying the principle of the field-effect transistor, in addition to a surface stress sensor, can be coated with a low-hygroscopic material and can achieve a similar effect as described above.

In the following Examples, an MSS is mainly used as the sensor main body, but it should be noted that a sensor main body usable in the present invention is not intended to be limited to an MSS.

Methods for coating a surface of a sensor main body with a receptor material include, but are not specifically limited to, ink jet spotting, dip coating, spray coating, spin coating, casting, and a coating using a doctor blade. In the following Examples, an example in which the receptor material is coated directly on the surface of the sensor main body is described, but other adoptable embodiments are not intended to be excluded. As examples of other non-limiting embodiments which can be applied to the present invention, a coating via a self-assembled membrane or a mixture with other polymers and the like can also be used as the receptor layer.

EXAMPLES

The present invention is described below in detail with reference to examples. It should be construed that the following examples are of course provided only to facilitate understanding of the present invention, and are not intended to limit the scope of the present invention to the examples in any way.

Example 1

Measurements of Four Kinds of Compounds by polysulfone-coated, polycaprolactone-coated, poly(vinylidene fluoride)-coated, and poly(4-methylstyrene)-coated Surface Stress Sensors Hereinafter, an example of preparation of receptor layers using the four kinds of polymers and measurements by using the receptor layers are described. Polysulfone (Product No. 428302-100G), polycaprolactone (Product No. 440752-250G), poly(vinylidene fluoride) (Product No. 427152-100G), and poly(4-methylstyrene) (Product No. 182273-10G) available from Sigma-Aldrich Japan were respectively dissolved in N,N-dimethylformamide to obtain 1 g/L of a solution, and then the solution was deposited onto a sensor main body (in this Example, an MSS main body, that is, a sensor chip) by ink jet. During the coating, the sensor chip was heated to 80° C. in order to accelerate drying of the deposited liquid. In this Example, a four-channel MSS was used, and the amount of the polymer to be applied to each channel is controlled by changing the amount of the liquid droplet. Specifically, 100 droplets were deposited onto the upper left channel, 200 droplets were deposited to the upper right channel, 300 droplets were deposited to the lower left channel, and 400 droplets were deposited to the lower right channel. Micrographs of the sensors after coating are shown in FIGS. 1A to 1D, respectively. In this Example, a piezoresistive surface stress sensor having a membrane type structure (MSS) was used as the sensor. Since the structure, the operation, and other characteristics of the MSS are well known by those skilled in the art, no further explanation is described. If needed, refer to Patent Literature 1, Non Patent Literature 1 or the like.

Figure 1A:
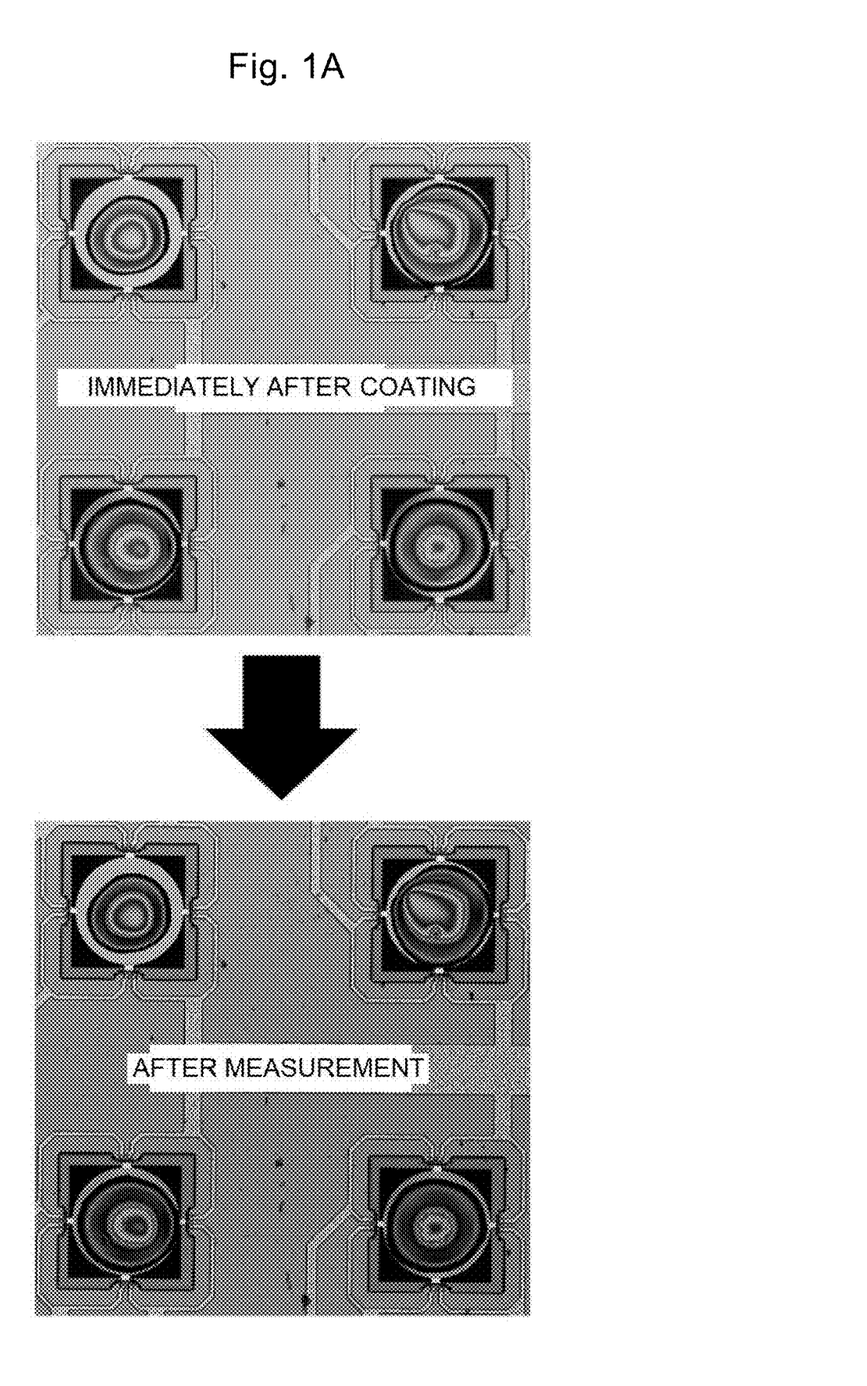
FIG. 1A shows optical micrographs of a polysulfone-coated MSS. Four photographs at the upper side show states immediately after coating, and four photographs at the lower side show states after measurement is performed by sequentially providing water, hexane, methanol, and acetone as sample gases. In the respective four photographs, the thickness of the coating is increased in order of the upper left, the upper right, the lower left, and the lower right.
Figure 1B:
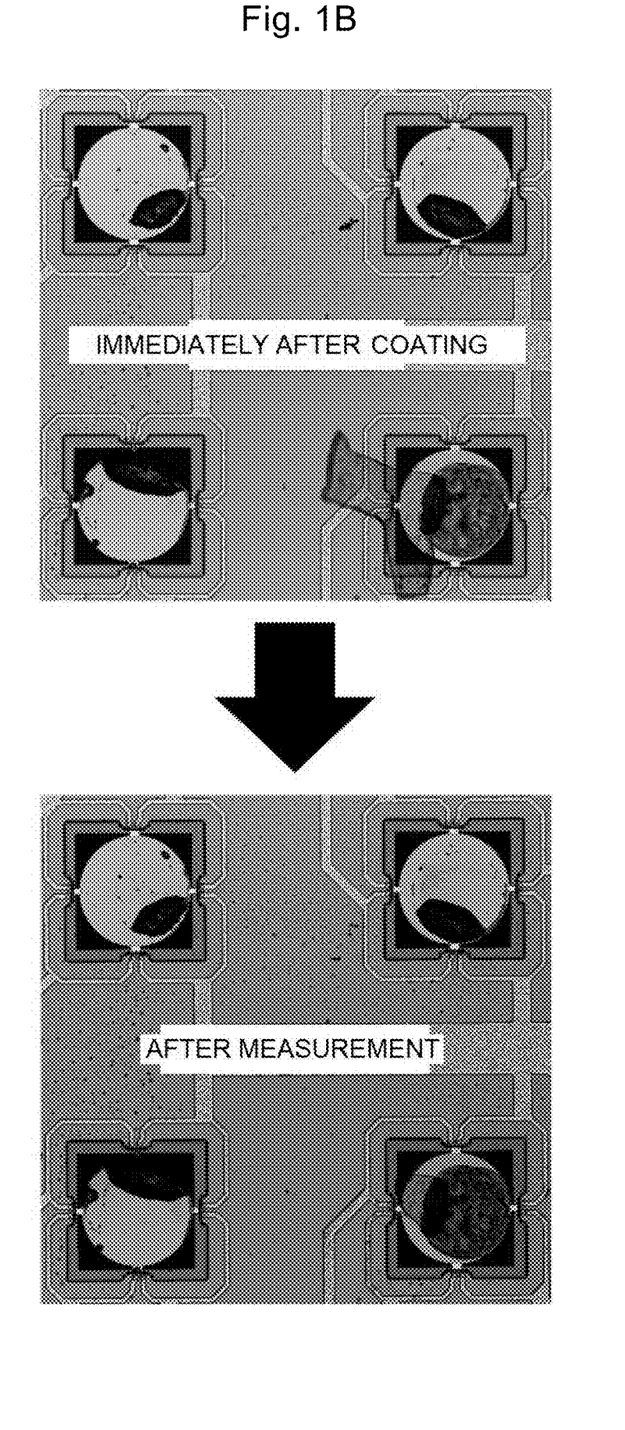
FIG. 1B shows optical micrographs of a polycaprolactone-coated MSS. Four photographs at the upper side show states immediately after coating (solution application), and four photographs at the lower side show states after measurement is performed by sequentially providing water, hexane, methanol, and acetone as sample gases. In the respective four photographs, the thickness of the coating is increased in order of the upper left, the upper right, the lower left, and the lower right.
Figure 1C:
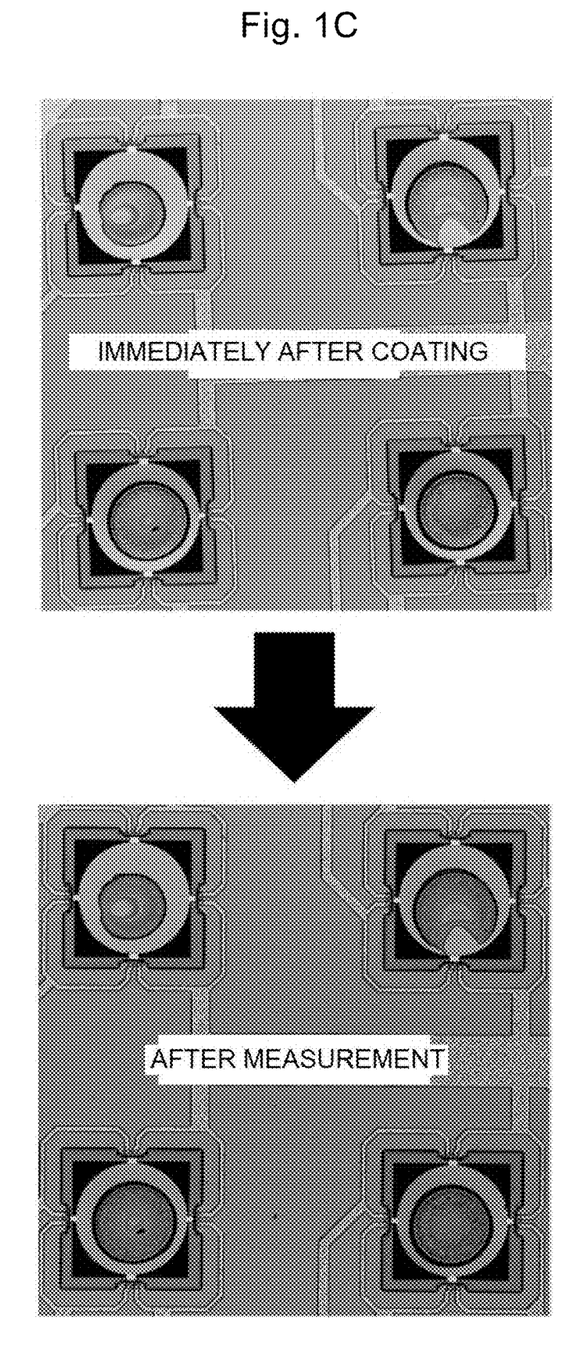
FIG. 1C shows optical micrographs of a poly(vinylidene fluoride)-coated MSS. Four photographs at the upper side show states immediately after coating (solution application), and four photographs at the lower side show states after measurement is performed by sequentially providing water, hexane, methanol, and acetone as sample gases. In the respective four photographs, the thickness of the coating is increased in order of the upper left, the upper right, the lower left, and the lower right.
Figure 1D:
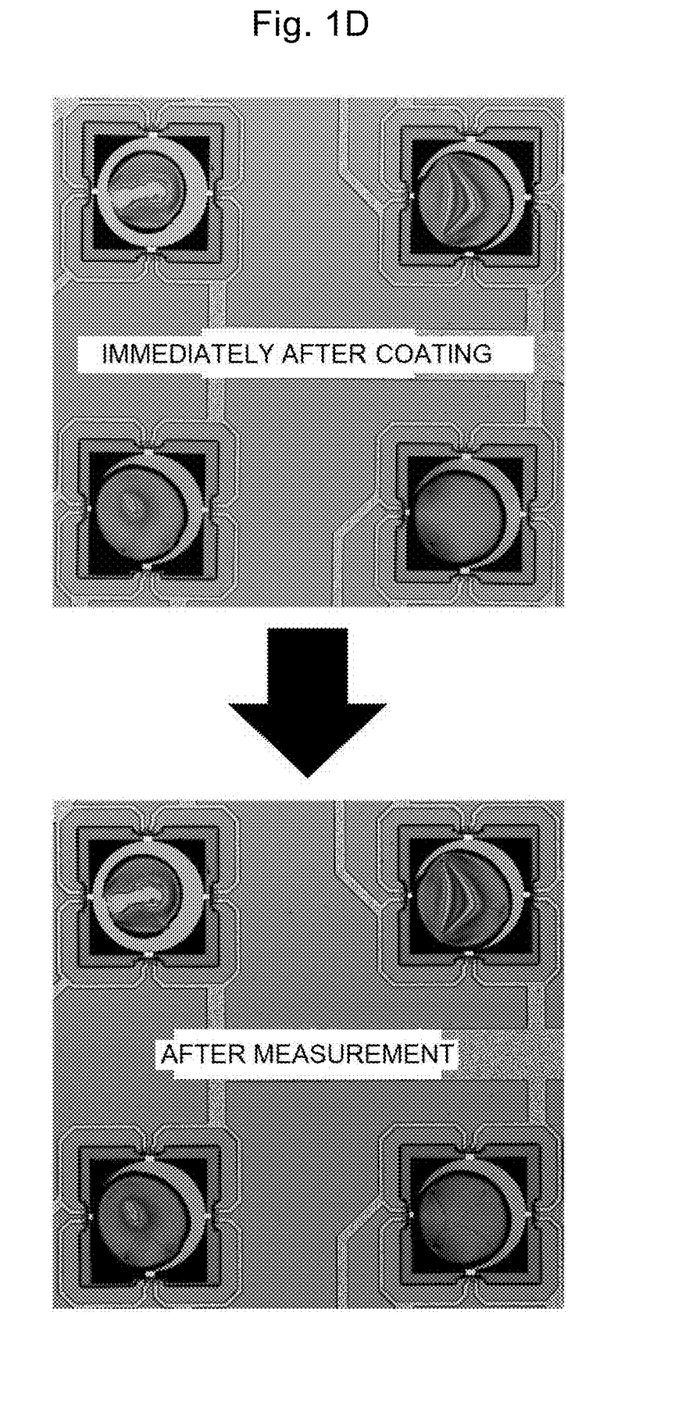
FIG. 1D shows optical micrographs of a poly(4-methylstyrene)-coated MSS. Four photographs at the upper side show states immediately after coating (solution application), and four photographs at the lower side show states after measurement is performed by sequentially providing water, hexane, methanol, and acetone as sample gases. In the respective four photographs, the thickness of the coating is increased in order of the upper left, the upper right, the lower left, and the lower right.
Figure 1E:
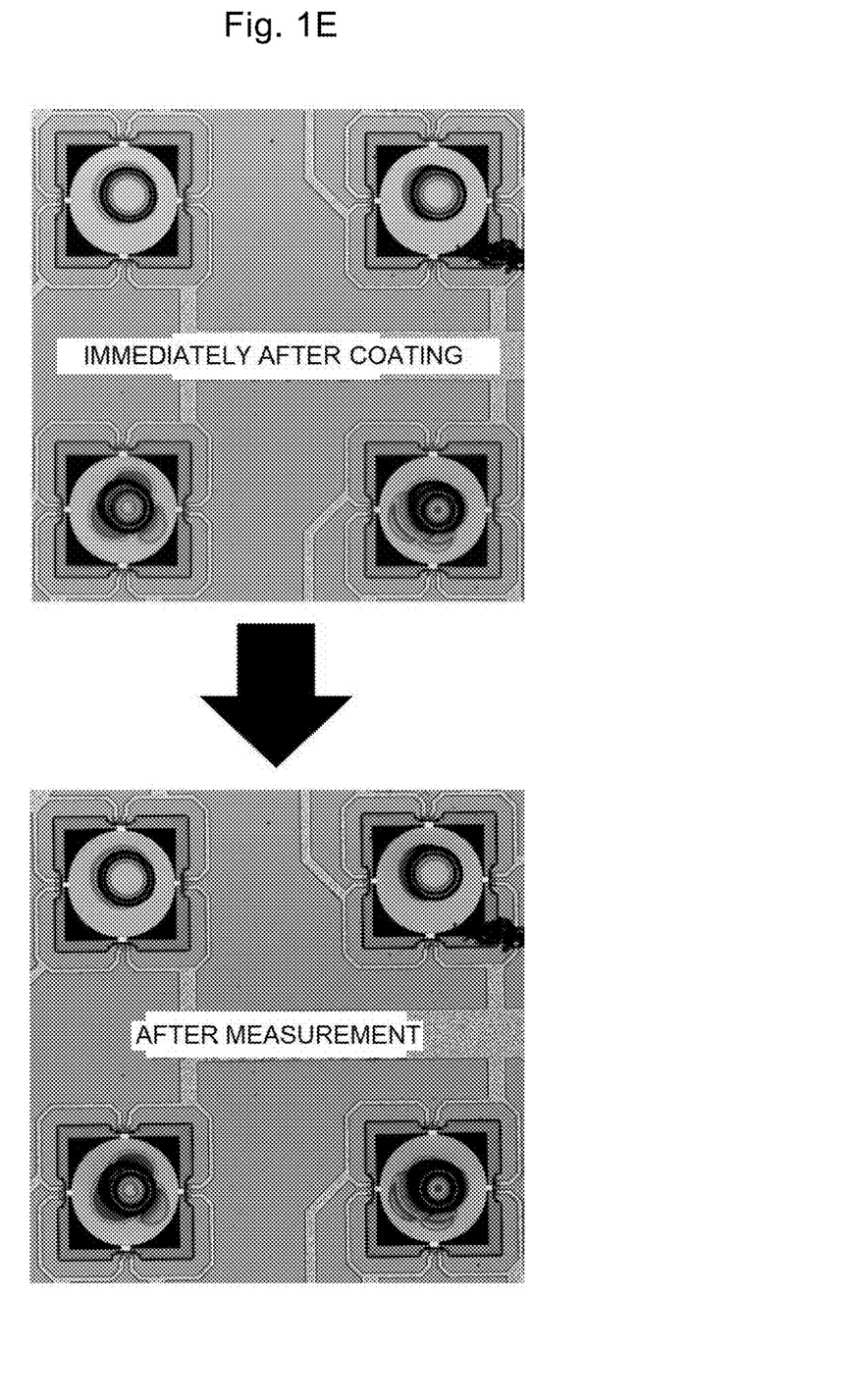
FIG. 1E shows optical micrographs of a carboxymethyl cellulose-coated MSS that is a comparative example. Four photographs at the upper side show states immediately after coating (solution application), and four photographs at the lower side show states after measurement is performed by sequentially providing water, hexane, methanol, and acetone as sample gases. In the respective four photographs, the thickness of the coating is increased in order of the upper left, the upper right, the lower left, and the lower right.

As a comparative example, carboxymethyl cellulose (available from Sigma-Aldrich Japan, Product No. C5678-500G) that is one of high-hygroscopic substances was applied to the MSS by the same method as described above. However, in this case, pure water was used as a solvent of carboxymethyl cellulose. Micrographs of the sensor after coating are shown in FIG. 1E.

Figure 2:
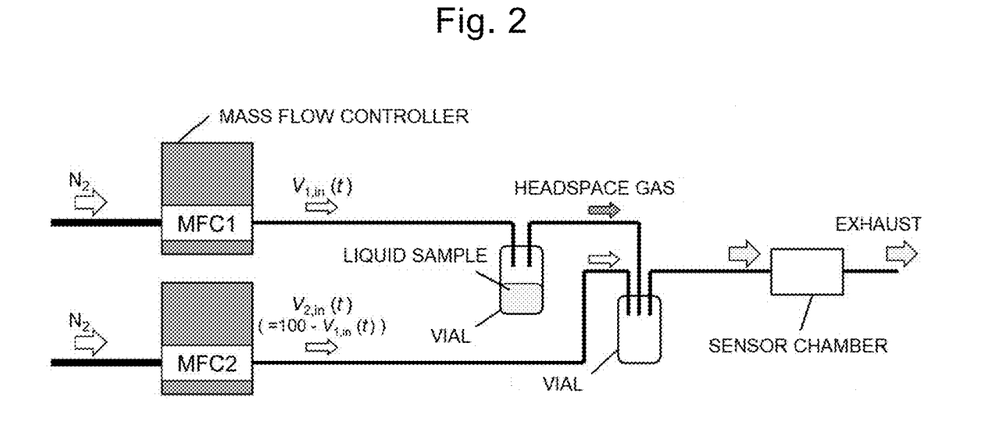
FIG. 2 is a conceptual diagram of the configuration of an experimental apparatus in which four kinds of compounds are measured by MSSs respectively coated with a polymer in Examples.

Subsequently, four kinds of chemical species described below were measured by the apparatus having a configuration illustrated in FIG. 2, in which polysulfone-coated MSS, polycaprolactone-coated MSS, poly(vinylidene fluoride)-coated MSS, or poly(4-methylstyrene)-coated MSS, or the carboxymethyl cellulose-coated MSS that is a comparative example was used. Specifically, water (ultrapure water), hexane, methanol, and acetone were used as the four kinds of chemical species. In FIG. 2, these four kinds of substances are collectively described as "liquid sample."

The sample chemical species were dispensed in vials, and nitrogen was flowed to the vials as a carrier gas at a flow rate of 100 mL/min regulated by a mass flow controller (MFC1). Thus, the gas containing a certain amount of sample vapor collected in the headspace of the vial was introduced in a tightly-closed chamber in which the sensor was located. Here, the sample vapor was obtained at room temperature. Another mass flow controller (MFC2) was used and operated under the same conditions. However, MFC2 was connected with an empty vial, and then connected to the sensor chamber to introduce nitrogen containing no sample vapor. Accordingly, desorption of samples adsorbed on the receptor layer was accelerated to clean the receptor layer. The above-described cycle of sample introduction and cleaning was repeated four times at intervals of 30 seconds. More specifically, a cycle including the sample introduction for 30 seconds and cleaning for 30 seconds was repeated four times (240 seconds in total).

Figure 3A:
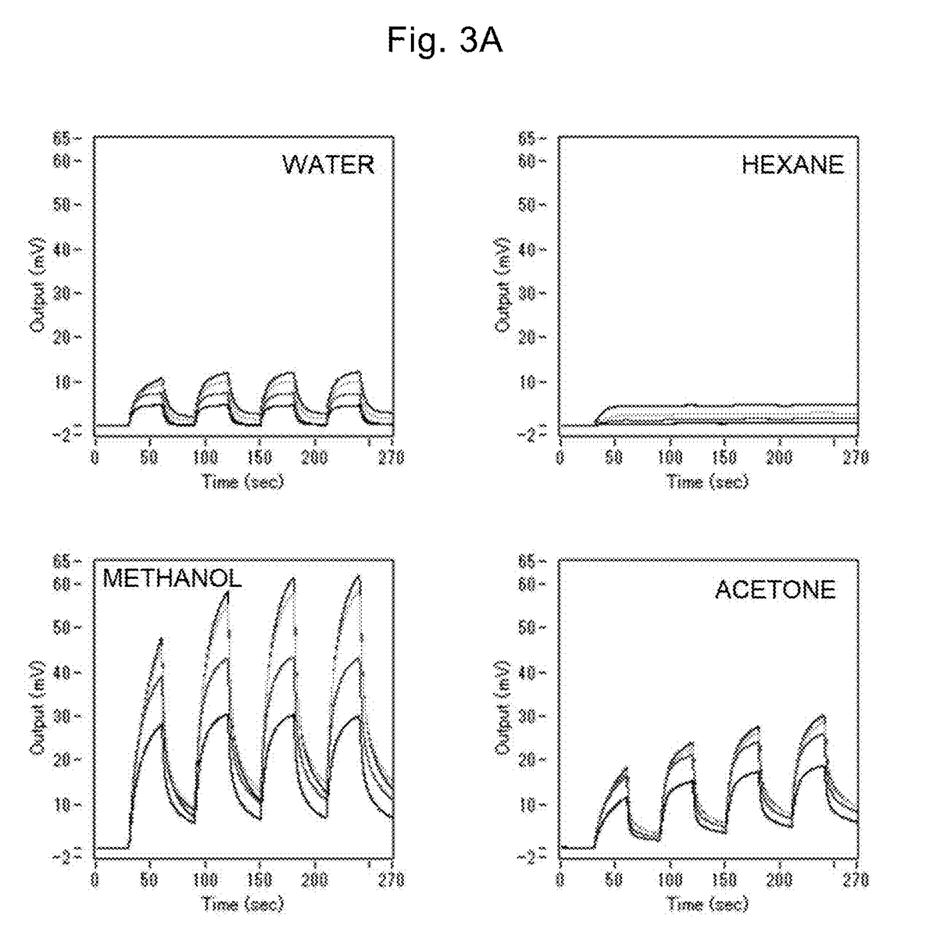
FIG. 3A shows results of measurements of four kinds of compounds by a polysulfone-coated MSS.
Figure 3B:
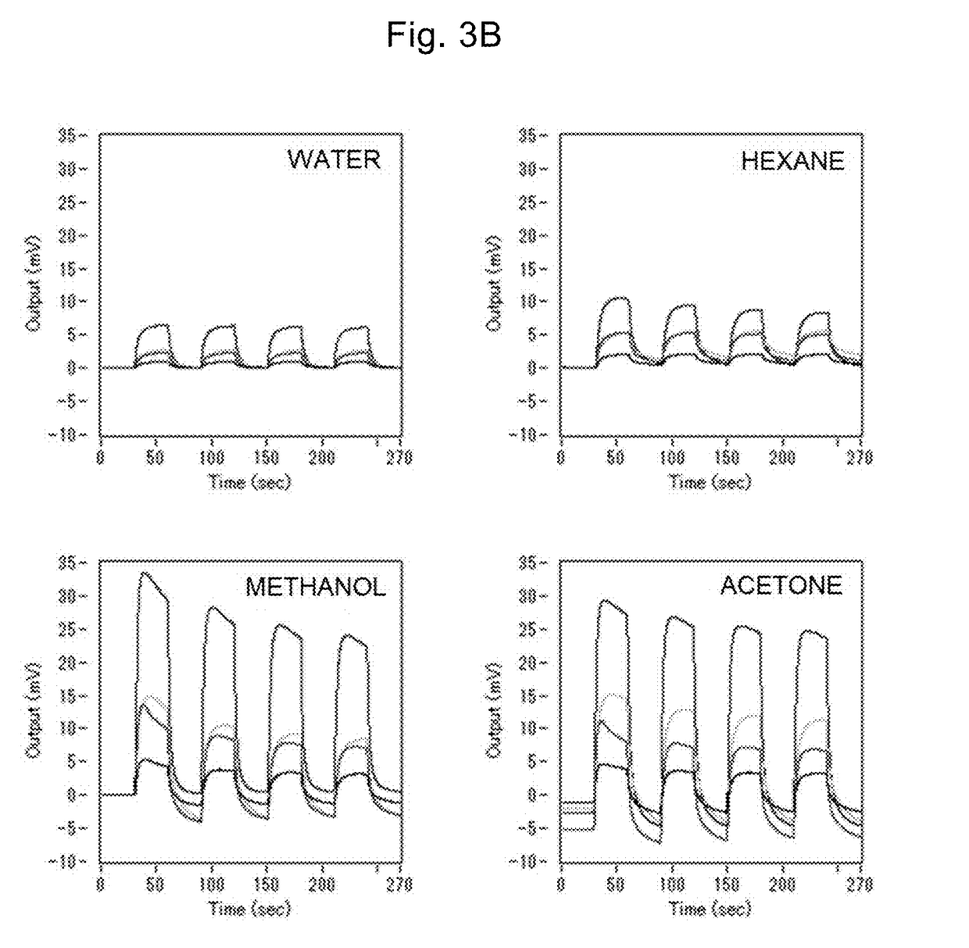
FIG. 3B shows results of measurements of four kinds of compounds by a polycaprolactone-coated MSS.
Figure 3C:
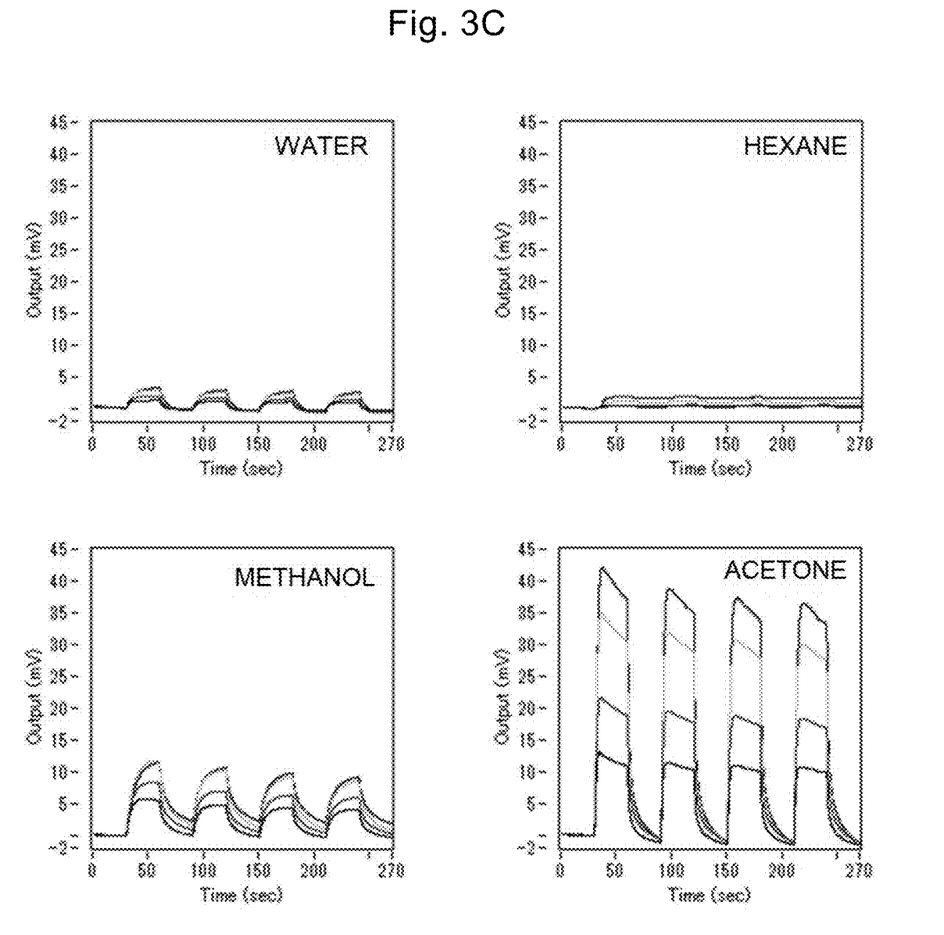
FIG. 3C shows results of measurements of four kinds of compounds by a poly(vinylidene fluoride)-coated MSS.
Figure 3D:
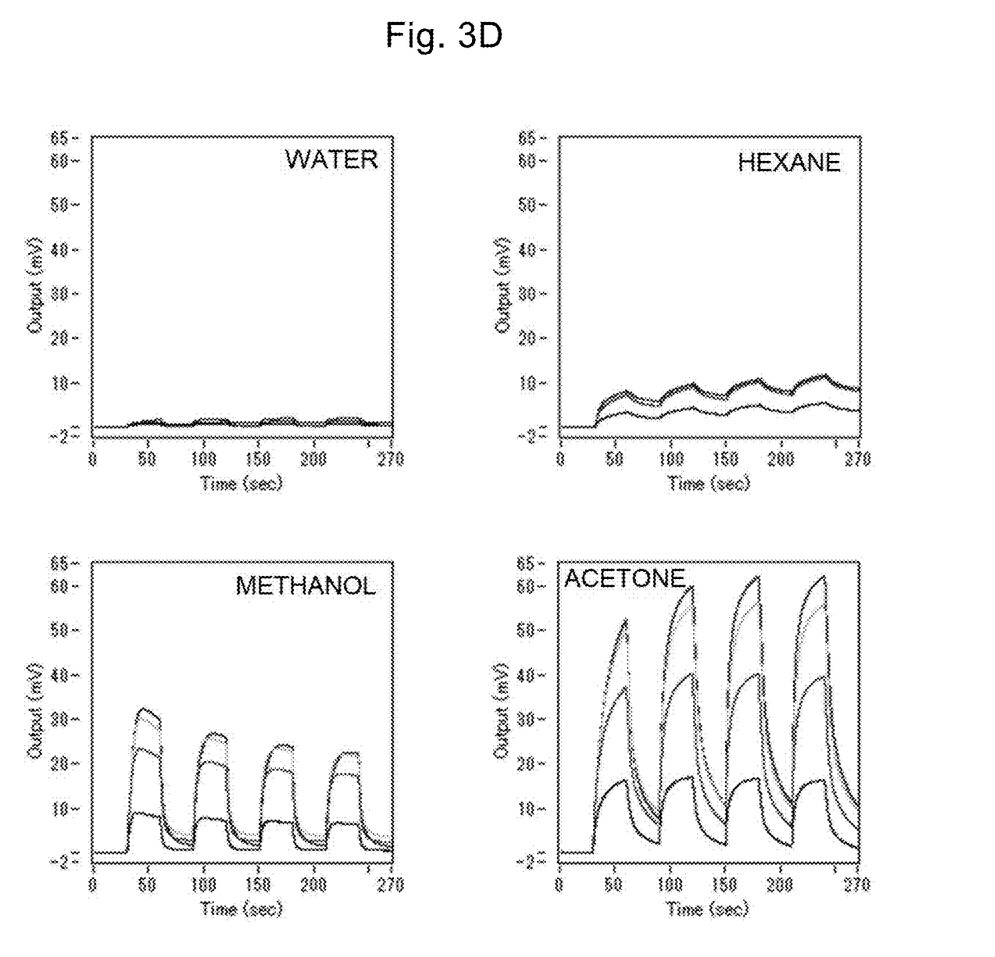
FIG. 3D shows results of measurements of four kinds of compounds by a poly(4-methylstyrene)-coated MSS.
Figure 3E:
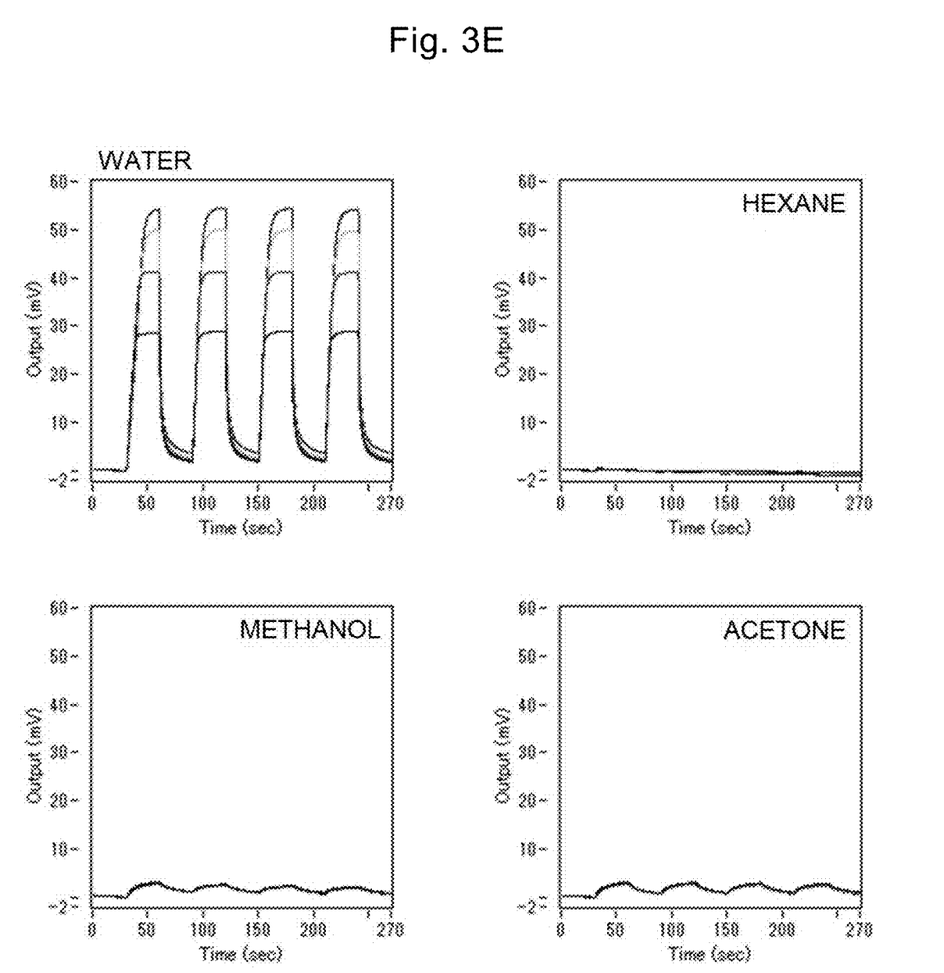
FIG. 3E shows results of measurements of four kinds of compounds by a carboxymethyl cellulose-coated MSS that is a comparative example.

Results of the measurements obtained by using the polysulfone-coated MSS, polycaprolactone-coated MSS, poly(vinylidene fluoride)-coated MSS, and poly(4-methylstyrene)-coated MSS are shown in FIGS. 3A to 3D, respectively. Further, results of the measurements obtained by using the carboxymethyl cellulose-coated MSS of a comparative example are shown in FIG. 3E. It is noted that the thicknesses of coating (receptor layer) of the MSS shown in FIGS. 1A to 1E increase in order of the upper left, the upper right, the lower left, and the lower right. In graphs shown in FIGS. 3A to 3E, outputs from the MSS including the coatings having these four kinds of thicknesses were displayed in an overlapping manner. It was confirmed that, even in the case of using any receptor, as the thickness of the receptor layer increases, the output also increases. It has been analytically confirmed that, when the thickness of the receptor layer increases, a stress obtained as a whole also increases, and therefore, an increase in output as a result is obtained (Non Patent Literature 4).

From output signals with respect to water, n-hexane, methanol, and acetone vapor of the polysulfone-coated MSS, polycaprolactone-coated MSS, poly(vinylidene fluoride)-coated MSS, and poly(4-methylstyrene)-coated MSS that are Examples of the present invention (shown in graphs of FIGS. 3A to 3D, respectively), it is found that the output signals with respect to water are significantly small in any cases. Therefore, in the receptor layer formed by the low-hygroscopic material, absorption of water is very small, and thus, even in the case of applying a high-humidity sample gas, it is also, of course, possible to prevent or suppress that a large amount of water is absorbed to saturate a change in physical quantity that causes a change in output signal of the MSS or adsorption of components other than water is avoided. In addition, it is also reduced that a minute output signal from the MSS derived from other trace components is buried in a large output signal from the MSS and masked due to water.

Furthermore, as seen from FIGS. 3A to 3D, output signals with respect to other three kinds of vapor, that is, hexane, methanol, and acetone considerably differ depending on receptor materials. In addition, from output signals with respect to methanol, it is found that even in the case of a water-miscible solvent, an output signal in the case of using a receptor layer formed by a low-hygroscopic material is not always decreased. Therefore, even when an MSS having a receptor layer formed by a low-hygroscopic material is used or a multi-channel sensor including only an MSS using a receptor layer formed by a low-hygroscopic material is used, a wide range of substances can be detected or a gas containing a mixture of a plurality of kinds of gases (for example, malodor occurring in a specific situation, or the like) can be detected. As a matter of fact, according to the circumstances, by using a combination with an MSS using a receptor layer formed by a high-hygroscopic material, a wider variety of detection can also be realized.

On the other hand, from FIG. 3E that is a graph of output signals from an MSS having a receptor layer formed by carboxymethyl cellulose, as a result of measurement as a comparative example, an output signal with respect to water is considerably large, but output signals with respect to other three kinds of vapor are considerably small. In the MSS using a receptor layer formed by such a material, even in the case of a substance outputting a significantly large signal other than water, in a case where a high-humidity gas is applied, the receptor layer absorbs a large amount of water and greatly swells so that an output signal of the MSS is saturated. Therefore, the detection of the substance is impossible or difficult. Such characteristics, from an opposite perspective, can be said to exclude an influence of impurity components as much as possible so that humidity can be measured with high purity.

INDUSTRIAL APPLICABILITY

As described above, according to the present invention, even in a case where water is contained in a sample in a large ratio, for example, the detection of trace components becomes easier, so that there is a possibility that the present invention is extensively used industrially.

CITATION LIST

Patent Literature

Patent Literature 1: WO 2011/148774 A

Non Patent Literature

Non Patent Literature 1: G. Yoshikawa, T. Akiyama, S. Gautsch, P. Vettiger, and H. Rohrer, "Nanomechanical Membrane-type Surface Stress Sensor" Nano Letters 11, 1044-1048 (2011).

Non Patent Literature 2: Imamura, G., Shiba, K. & Yoshikawa, G. Smell identification of spices using nanomechanical membrane-type surface stress sensors. Japanese Journal of Applied Physics 55, 1102B1103 (2016).

Non Patent Literature 3: Riki Eto, Genki Yoshikawa, Gaku Imamura, "Smell Data Mining on the Cutting-edge IoT Olfactory Sensor," The Japanese Society for Artificial Intelligence, 31st National Convention Preliminary Report 2B2-1 (2017).

Non Patent Literature 4: Yoshikawa, G., "Mechanical analysis and optimization of a microcantilever sensor coated with a solid receptor film" Applied Physics Letters 98, 173502 (2011).

The invention claimed is:

1. A surface stress sensor receptor made of a low-hygroscopic material, wherein the low-hygroscopic material is selected from the group consisting of polysulfone, polycaprolactone, poly(vinylidene fluoride), and poly(4-methylstyrene).

2. The surface stress sensor receptor according to claim 1, further comprising a binder.

3. A surface stress sensor comprising a low-hygroscopic receptor layer formed by the receptor according to claim 1 on a surface of a sensor main body.

4. The surface stress sensor according to claim 3, further comprising an additional membrane between the low-hygroscopic receptor layer and the sensor main body.

5. The surface stress sensor according to claim 4, wherein the additional membrane is a self-assembled membrane.

6. The surface stress sensor according to claim 3, wherein the surface stress sensor has a plurality of the sensor main bodies.

7. The surface stress sensor according to claim 6, wherein at least one of the plurality of the sensor main bodies has the low-hygroscopic receptor layer.

8. The surface stress sensor according to claim 3, wherein the sensor main body is a membrane-type surface stress sensor.

* * * * *